H. MULFORD.
Stove Grate.
No. 99,584.   Patented Feb. 8, 1870.
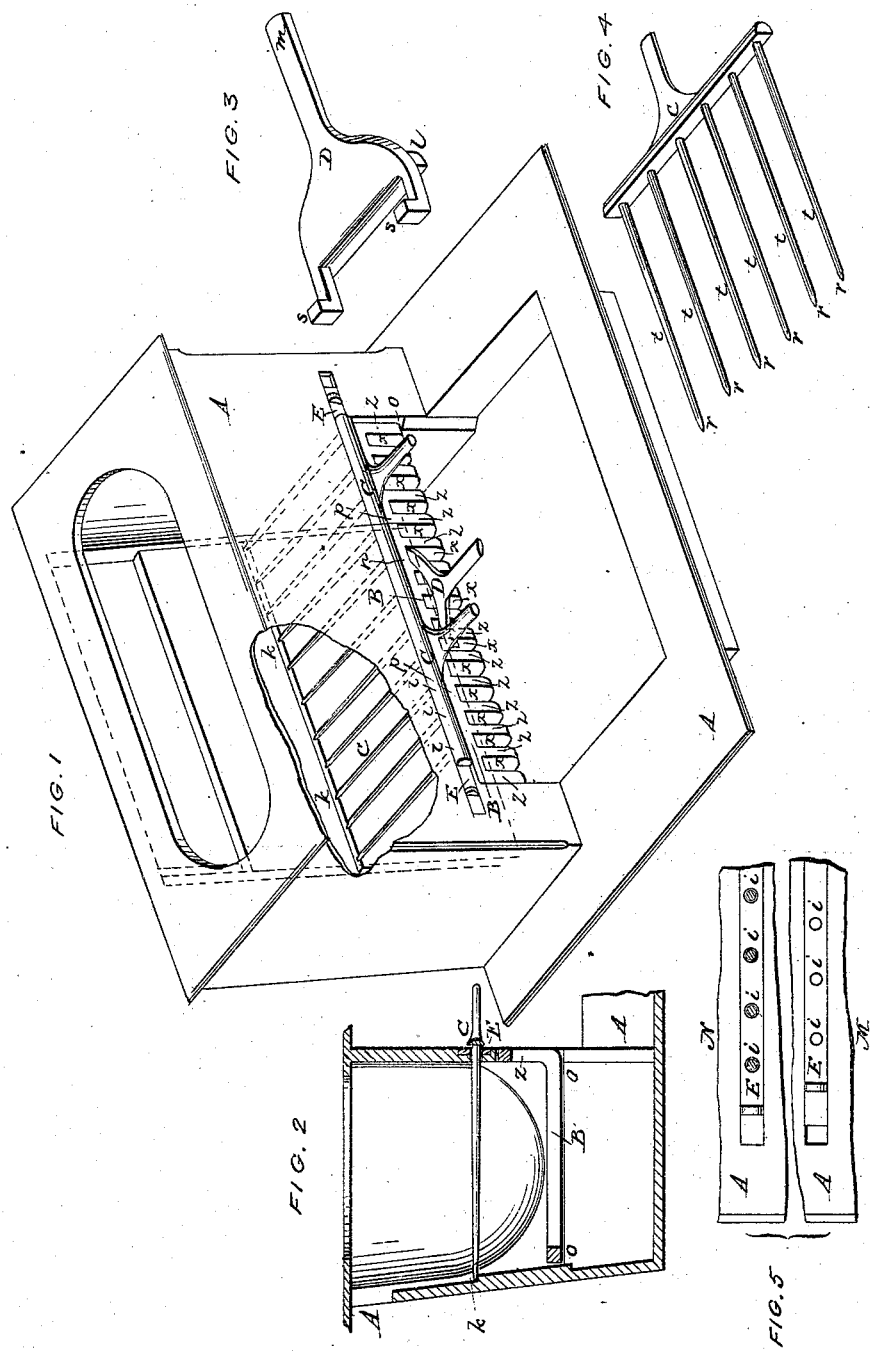

United States Patent Office.

HOWELL MULFORD, OF PHILADELPHIA, PENNSYLVANIA.

*Letters Patent No. 99,584, dated February 8, 1870.*

IMPROVEMENT IN GRATES.

The Schedule referred to in these Letters Patent and making part of the same.

*To all whom it may concern:*

Be it known that I, HOWELL MULFORD, of the city and county of Philadelphia, in the State of Pennsylvania, have invented a new and useful Improvement in Grates and Grate-Bars; and I do declare the following to be a full and exact description thereof, reference being had to the annexed drawings, constituting a part of this specification.

My invention relates to providing stoves or other heating-apparatus with a grate, made in the usual manner, having a horizontal bed of bars, curving upward in front to a vertical position, the ends whereof are connected and surmounted by a bar. The whole may be formed of one casting. This grate rests or slides upon two ledges or projections, one upon each side of the ash-pit, and sufficiently elevated above its upper surface to allow the grate to be inserted or withdrawn freely. These shelves or projections may be continuous, or have open spaces at intervals, through which the ashes may fall.

In combination with said grate, I use a grate-fork, having teeth of required length and strength, and pointed, which project from a common cross-piece, to which said teeth are firmly attached. Said cross-piece is provided with a handle on the opposite side to the teeth, by means whereof the fork is operated. The teeth of the fork are passed through apertures in the front of the stove, a short distance above the upper bar of the grate, and are pressed inward and backward, until that portion of the cross-piece between the teeth meets that portion between the apertures through which the teeth pass. The points of the teeth then rest upon a ledge or projection on the back part of the fire-pit, which projection is on a level with the lower parts of said apertures.

The apertures aforesaid are made in a line, in a horizontal-sliding bar in the front of the stove, and directly opposite and back of them, other apertures of similar size are made in the front of the stove, so that when the forks are withdrawn, and it is desired to close the apertures, the bar can be moved in either direction, thus covering the openings both in the stove and bar or slide.

For the purpose of operating the sliding grate, I use an implement composed of one piece of metal, or of metal having a non-conducting handle. This implement has a straight handle, of sufficient length, and attached to a plate, having two arms projecting forward, one on each side, on the extremities of which arms, standing at right angles and perpendicularly to the upper surface of the arm, are projections or shoulders. The distance between the surface of the projection toward the handle, and the junction of the arm with the plate, should be sufficient to receive the upper bar of the grate, intended to be removed by this appliance. On the lower side of the plate is a shoulder running across the entire width thereof, and so placed or cast that the front of the appliance between the projecting arms and that surface of the shelf toward the arms, are in the same vertical plane.

The following is a description of the drawings, illustrating the above-described invention.

Figure 1 represents a perspective view of the stove, having the sliding grate B and grate-fork C in place, and the holder D attached.

Figure 2 represents a sectional view of the same, without holder attached.

Figure 3 represents a perspective view of the holder D.

Figure 4 represents a perspective view of the grate-fork C.

Figure 5 represents a section of the slide E, and a portion of the front of the stove.

A N shows the slide in position to receive the grate-fork.

E M shows the slide closed.

I will now proceed to illustrate the operation of my invention.

I take the holder, fig. 3, and place the shoulders s and s, one in each of two of the spaces x, by which the bars z of the sliding grate B are separated, and then bring the holder up until the space is immediately behind the shoulders s, and comes in contact with the lower surface of the bar n, which connects the bars of the grate.

Then bearing down upon the handle m, the shoulder l comes in contact with the front of the bars of the grate, and, in combination with the shoulders s and s, and the pressure on the handle m, forms a temporary attachment, by means of which the sliding grate B can be easily withdrawn and held supported when so displaced.

To replace the grate B, attach the holder, fig. 3, as before. Place the lower surfaces of the back parts of the side bars of the grate upon the ledges o and o, and push the grate to place.

The distance between the shoulders s and s should correspond with the distance between the spaces separating the bars, into which it is desired to insert the shoulders s.

In operating the grate-fork, fig. 4, I first open the apertures i in the slide E, by moving it until the openings therein come directly in front of the openings in the front of the stove, fig. 1. I then insert the points r of the teeth t, and press the fork backward until the points r can rest upon the ledge. I thus take upon the fork whatever fuel and coals there may be in the fire-pit, above the level of the ledge k. The sliding grate B may then be removed in the manner above mentioned, emptied of ashes, and returned to place.

The fork C is then withdrawn, and the fuel and coals deposited in the grate. The slide is then moved so as to cover the apertures in the front of the stove, whereby the spaces between said apertures serve to cover those in the sliding bar or slide.

What I claim as my invention, and desire to secure by Letters Patent, is—

1. The combination and arrangement of the grate-fork C, with the sliding bar or damper E, substantially as shown and described, in combination with the sliding grate B.

2. The holder D.

In testimony that I claim the foregoing improvements in sliding grates and grate-forks, I have hereunto set my hand and seal, this 15th day of July, 1869.

HOWELL MULFORD. [L. S.]

Witnesses:
R. W. WALKER,
C. ROWLAND.